United States Patent [19]

Strahorn et al.

[11] 4,059,517
[45] Nov. 22, 1977

[54] LIQUID SEPARATION APPARATUS AND METHOD

[75] Inventors: David F. Strahorn; Roger F. Goldstein, both of Oakland, Calif.

[73] Assignee: Chevron Research Company, San Francisco, Calif.

[21] Appl. No.: 722,972

[22] Filed: Sept. 13, 1976

[51] Int. Cl.² .......................................... B01D 17/00
[52] U.S. Cl. ................... 210/73 R; 210/84; 210/188; 210/316; 210/5.32 R; 210/539; 210/540; 55/174; 55/185
[58] Field of Search ................... 55/97, 171, 174, 185, 55/186, 188, 319 D, 16.25, 176; 210/73 R, 730 W, 84, 188, 316, 320, 532 R, 539, 540, DIG. 5

[56] References Cited

U.S. PATENT DOCUMENTS

| 2,090,813 | 8/1937 | Schumacher | 210/730 W |
| 2,717,081 | 9/1955 | Wilson | 210/109 |
| 2,783,854 | 3/1957 | Lovelady et al. | 55/174 |
| 2,825,422 | 3/1958 | Schoenfeld | 55/166 |
| 2,870,860 | 1/1959 | Ray | 55/186 |
| 2,887,174 | 5/1959 | Ray | 55/186 |
| 3,804,252 | 4/1974 | Rishel | 210/84 |

*Primary Examiner*—Frank W. Lutter
*Assistant Examiner*—David L. Lacey
*Attorney, Agent, or Firm*—D. A. Newell; R. H. Davies; W. D. Reese

[57] ABSTRACT

Apparatus and a method for gravity separating lighter and heavier liquids are disclosed, the apparatus including a vessel with its interior divided by a horizontal baffle into upper and lower spaces, which are in communication at one end. The horizontal baffle is shaped to provide a sloping floor in the upper space. Mixed lighter and heavier liquids are passed into the lower space, forming a heavier, lower phase, containing most of the heavier liquid and a lighter, upper phase containing the lighter liquid and a small amount of heavier liquid. The lighter phase passes into one end of the upper space. The opposite end of the upper space has a vertical baffle to retain the lighter phase above the sloping floor formed by the horizontal baffle. The minor portion of heavier liquid separates by gravity from the lighter phase and flows toward the lower portion of the sloping floor, and the lighter liquid is removed from the vessel through an outlet orifice located at the higher portion of the floor. The minor portion of heavier liquid is drained from the lower portion of the sloping floor into the heavier phase.

15 Claims, 3 Drawing Figures

LIQUID SEPARATION APPARATUS AND METHOD

BACKGROUND OF THE INVENTION

The present invention relates to apparatus and a method for separating a heavier liquid and a lighter liquid. In one aspect, the invention relates to apparatus for separating a heavier liquid, a lighter liquid and a gas.

It is often necessary to separate mixtures of lighter and heavier liquids. For example, the effluent from hydrocarbon processing reactors often contains a heavier aqueous liquid and a lighter hydrocarbonaceous liquid, which are relatively immiscible. In addition, reactor effluents often contain a vapor or gas. It is desirable to separate the aqueous material from the hydrocarbonaceous material and to separate gas from the liquids to facilitate further processing of the hydrocarbonaceous material, and to permit recycle of hydrogen in the gas.

Various configurations of separation equipment have been suggested and used commercially for separating mixture of lighter and heavier liquids. For example, in one system, a mixture of lighter and heavier liquids and gases is introduced into one end of a horizontal, elongated vessel. A longitudinal settling chamber extends along the bottom of the vessel from a point near the inlet to the other end of the vessel. The settling chamber is closed off from the major portion of the vessel's interior, but has an opening into the major portion of the interior near the mixture inlet. This opening is normally filled by a fluids-permeable coalescing pad. In a separator of this type, most of the gas separates from the liquids and is withdrawn from the major portion of the interior of the vessel before the mixture of liquids enters the settling chamber. After passing through the coalescing pad into the chamber, liquids flow along the length of the chamber while separating into an upper lighter phase and a heavier lower phase. Typically, the lower phase is an aqueous liquid and the upper phase is a hydrocarbonaceous liquid. These two phases are then separately withdrawn from the vessel, the lighter hydrocarbonaceous liquid being removed from the chamber through the end wall of the vessel, and the heavier aqueous liquid through the bottom of the vessel.

Heretofore, it has been difficult to obtain a satisfactory separation of a hydrocarbonaceous liquid from an aqueous liquid when the viscosity of the hydrocarbonaceous liquid is high and the density of the hydrocarbonaceous liquid is relatively close to that of the aqueous liquid. The difficulty of making such a separation has resulted in the use of undesirably large, complex and expensive separation equipment. Separators previously suggested include numerous baffles, chambers, conduits and the like. The apparatus and method of the present invention permit liquid mixtures, such as oil-water mixtures, to be easily and economically separated. The present invention further optionally provides for separation of gases which may be present in admixture with such liquids.

SUMMARY OF THE INVENTION

According to one embodiment of the present invention, there is provided apparatus for gravity separation of a lighter liquid from a heavier liquid, comprising: a horizontally elongated vessel; means forming a generally horizontal first baffle within the vessel, extending transversely entirely across the interior of the vessel and separating an upper longitudinally extending space and a lower longitudinally extending space in the vessel, the upper space and the lower space being in open communication at first longitudinal ends thereof; the first baffle defining a sloping floor of the upper space having a higher portion and a lower portion; means forming a generally vertical second baffle located at a second longitudinal end of the upper space, extending upwardly from the floor of the upper space higher than the higher floor portion and extending transversely entirely across the upper space; means for introducing a mixture of the lighter liquid and the heavier liquid into the vessel at a locus adjacent to and in communication with a second longitudinal end of the lower space; means for removing the heavier liquid from the vessel from a lower part of the lower space; means for removing the lighter liquid from the vessel from adjacent the higher portion of the upper-space floor; and means for passing heavier liquid from above the lower portion of the upper space floor into the lower space.

Preferably, the apparatus is adapted, in addition, for separating gas from the lighter and heavier liquids, with the vessel including a shell completely enclosing the upper and lower spaces, and with means provided for withdrawing gas from the upper side of the shell.

The sloping floor of the upper space is preferably shaped so as to slope downwardly from its longitudinal centerline toward lower lateral edges adjacent the side walls of the vessel, and a vertical third baffle may be provided at the first end of the upper space to retain a small amount of heavier liquid above the lower portion of the sloping floor.

Relatively small amounts of heavier liquid are preferably passed from the upper space into the lower space by way of one or more conduits with an inlet from the lower portion of the upper space floor at one end and an opening into the bottom part of the lower space at the other end.

The lighter liquid outlet is preferably located to withdraw liquid from the upper space from adjacent the vertical, second baffle. A vertically disposed coalescing pad is preferably positioned between the liquid mixture inlet and the lower longitudinal space.

According to another embodiment of the invention, there is provided a method for gravity separating a lighter liquid from a heavier liquid by the steps of: (a) passing a mixture of the lighter and heavier liquids into one end of a lower longitudinally extending space in a horizontally elongated vessel, and flowing the mixture toward an opposite end of the lower space, whereby the mixture separates to form a lower phase comprising a major portion of the heavier liquid and an upper phase comprising the lighter liquid and a minor portion of the heavier liquid; (b) passing the upper phase from the opposite end of the lower space into one end of an upper longitudinally extending space in the vessel, the upper space being in communication at one end thereof with the lower space and separated from the lower space along its length by a substantially horizontal baffle extending transversely entirely across the vessel, the baffle forming a sloping upper space floor having a higher portion and a lower portion, the upper phase being retained in the upper space by a generally vertical baffle extending transversely entirely across an opposite end of the upper space; (c) removing the heavier liquid from the vessel by passing the lower phase out of the lower space at a rate sufficient to maintain an upper surface of the lower phase above the heavier liquid outlet and below the horizontal baffle; (d) flowing the upper phase toward the opposite end of the upper space, whereby the minor portion of the heavier liquid separates from the upper phase, and flowing the separated minor portion of the heavier liquid to the lower portion of the sloping floor; (e) removing the lighter liquid from the vessel by passing the upper phase out of the upper space from a locus at least as high as the higher floor portion at a flow rate sufficient to maintain an upper surface of the upper phase above the higher portion of the floor and below a top of the vertical second baffle; and (f) flowing the separated minor portion of the heavier liquid from above the lower floor portion into the lower phase.

Other objects, advantages and embodiments of the present invention will be apparent to those skilled in the art from the appended drawings, the description thereof, and the following detailed description of the invention.

BRIEF DESCRIPTION OF THE DRAWINGS

The attached drawings illustrate the preferred embodiment of the apparatus of the present invention in which.

DETAILED DESCRIPTION OF THE INVENTION

The present invention can best be described with reference to the attached drawings, which depict a preferred embodiment of the apparatus of the invention. It will be understood, however, that it is not intended thereby to limit the invention strictly to the embodiments shown, and that it is intended to cover the alternatives, modifications and equivalents of the described embodiment apparent to those skilled in the art and within the scope of the appended claims.

Figure 1:
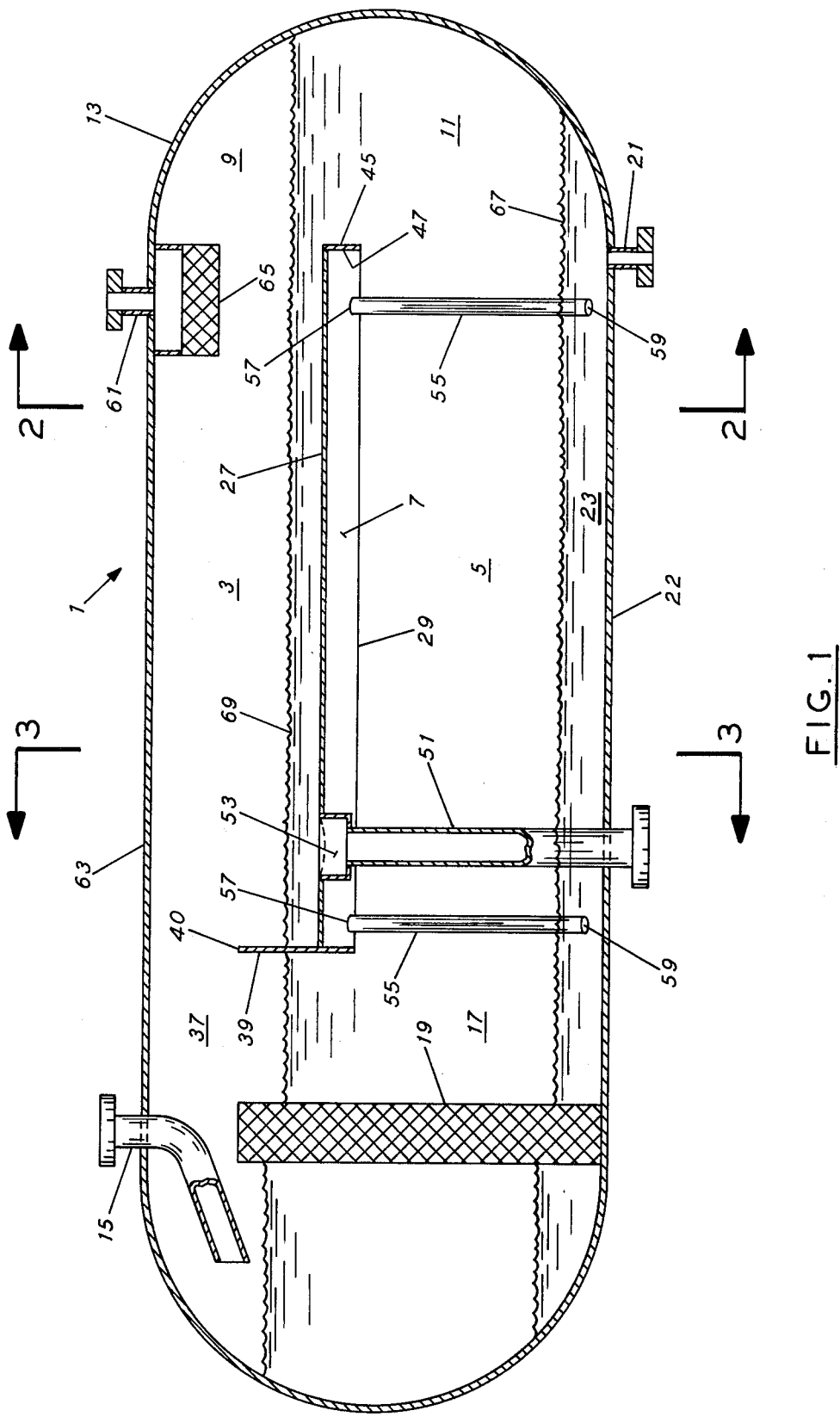
FIG. 1 is a side sectional view through the centerline of an embodiment of the separation apparatus.

Turning first to FIG. 1, there is shown apparatus for gravity separation of a lighter liquid from a heavier liquid, including a horizontally elongated vessel 1. In the interior of the vessel 1, an upper longitudinally extending space 3 and a lower longitudinally extending space 5 are defined by means forming a generally horizontal baffle which extends transversely entirely across the interior of the vessel, such as the baffle 7 (see FIGS. 2 and 3). The baffle 7 extends longitudinally in the vessel 1 to define the longitudinal extensions of the upper space 3 and the lower space 5, which are in open communication at a first end 9 of the upper space 3 and a first end 11 of the lower space 5. The vessel 1 preferably comprises a shell 13 surrounding the upper space 3 and the lower space 5 and forming a liquid-tight and gas-tight enclosure.

Means, such as an inlet conduit 15, are provided for introducing a mixture of the lighter and heavier liquids into the shell 13. The inlet conduit 15 is preferably adapted for introducing liquid-gas mixtures. The inlet conduit 15 introduces liquids, and preferably gas, into the vessel 1 at a locus adjacent to and in communication with a second longitudinal end 17 of the lower space 5. A generally vertical, liquid and gas permeable coalescing pad 19 is preferably disposed transversely entirely across the interior of the vessel 1 between the inlet conduit 15 and the end 17 of the lower space 5. Means are provided for removing a heavier liquid from the vessel 1, such as a liquid outlet conduit 21, through the bottom wall 22 of the shell.

According to the invention, the baffle 7 is positioned and shaped to provide a sloping floor of the upper space 3 having a higher floor portion and a lower floor portion. In the embodiments shown, a floor 25 is formed to slope downwardly from a higher portion adjacent a longitudinal centerline 27 of the floor 25 toward lower lateral edge portions of the floor 25 adjacent the junctures 29 and 31 of the baffle 7 with lateral walls 33 and 35, respectively, of the shell 13. Means are provided for forming a generally vertical second baffle at a second longitudinal end 37 of the upper space 3, such as a vertical baffle 39, which extends transversely entirely across the upper space 3 between the lateral walls 33 and 35, the top edge 40 of the baffle 39 extending vertically at least higher than the highest point of the baffle floor 25 (as at the centerline 27) in order to retain liquids in the space 3 to a liquid level above the baffle floor 25. The vertical baffle 39 prevents liquid flow into or out of the upper space 3 at the end 37.

Figure 2:
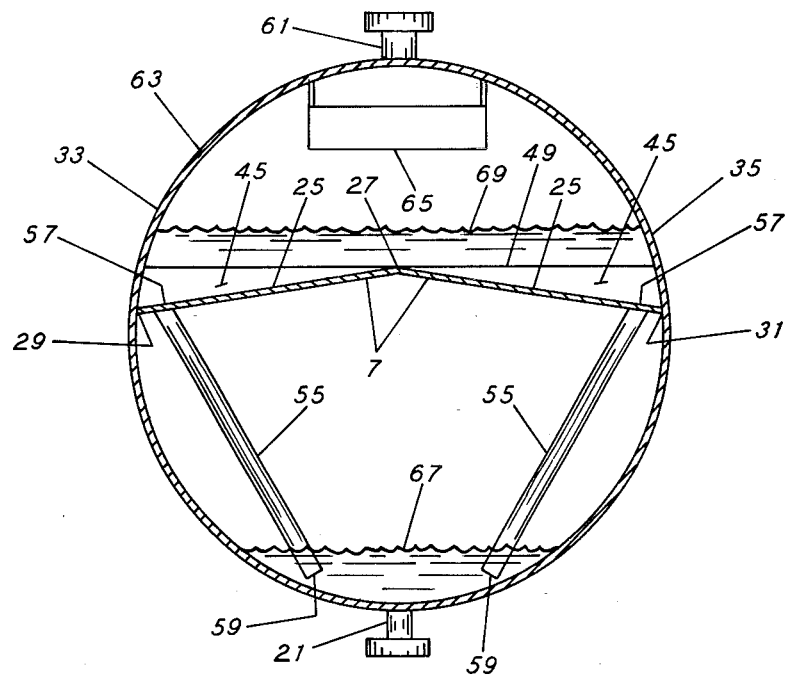
FIG. 2 is a sectional view of the apparatus shown in FIG. 1 taken along lines 2—2 in FIG. 1.
Figure 3:
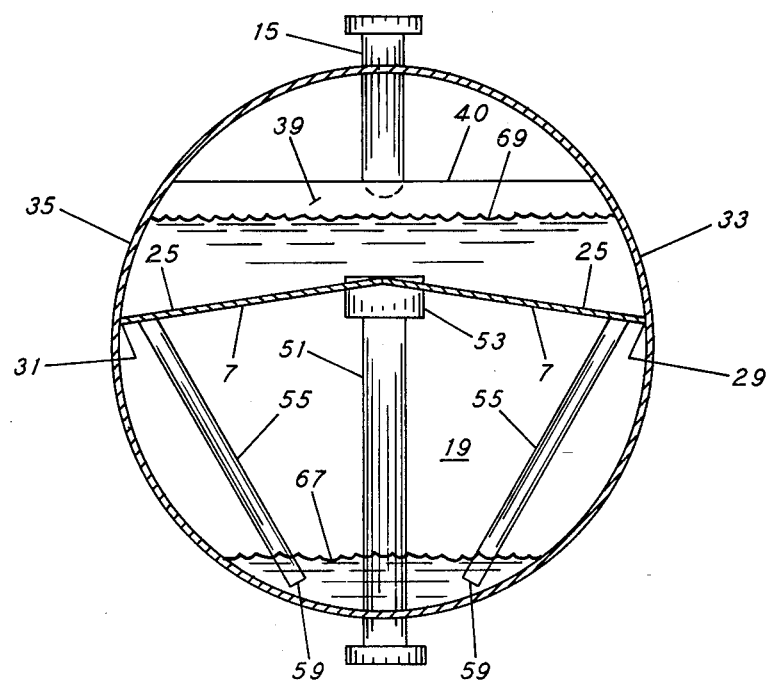
FIG. 3 is a sectional view of the apparatus shown in FIG. 1 taken along lines 3—3 in FIG. 1.

A smaller vertical third baffle 45 is preferably positioned across the end 47 of the horizontal baffle 7, with its top edge 49 being not higher than the highest portion 27 of the baffle 7 (see FIG. 2). The baffle 45 retains a small amount of a heavier liquid in the upper space 3 above the lower portions of the floor 25 adjacent the edges 29 and 31 of the baffle 7.

Further, according to the invention, means are provided for removing a lighter liquid from the upper space 3 from a locus at least as high as the higher portion of the sloping floor 25 and below the top edge 40 of the baffle 39, such as a liquid outlet conduit 51, with the outlet opening thereof 53 from the space 3 located adjacent the end 37 of the upper space 3. The outlet conduit 51 extends from the outlet opening 53 at about the centerline 27 of the upper space floor 25 downwardly out of the vessel 1 through the bottom 22 of the shell 13. Means are also provided for passing heavier liquid from the upper space 3 above the lower portion of the sloping floor 25 into the lower part 23 of the lower space 5, such as, in the embodiment depicted, a plurality of conduits 55, each of which communicates at one end with the upper space 3 by way of an opening 57 in the lower lateral edge portions of the floor 25 adjacent one of the shell walls 33 and 35, and each of which communicates at an opposite end 59 thereof with the lower part 23 of the lower space 5.

The apparatus is preferably further adapted for separating a gas component from liquids, as by including therein means for withdrawing gases from an upper part of the shell 13, such as a gas outlet 61 in the top wall 63 of the shell 13. Means are preferably supplied for retaining in the vessel any mist which may become entrained in gases, prior to removing the gases via the outlet 61, such as a gas-permeable pad 65, located between the interior of the vessel 1 and the outlet 61. The gas outlet 61 preferably communicates with the liquid inlet 15 within the shell 13, as by a path extending above the pad 19 and the vertical baffle 39 and through the upper space 3, to allow gas to move freely directly to the gas outlet 61 upon introduction from the inlet 15, after separation from liquids.

In operation of the above-described embodiment of the apparatus, according to the method of the invention, a lighter liquid is separated from a heavier liquid. Mixtures of liquids which may be separated include any lighter and heavier liquids which form two separate phases upon standing, especially two substantially immiscible liquids. For example, mixtures of a lighter (less dense) hydrocarbonaceous liquid and a heavier (denser) aqueous liquid are preferred mixtures for separation according to the present method. The present invention is particularly adapted for separating the liquid components, and preferably gaseous components, of a cooled, high-pressure effluent from a vacuum gas oil (VGO) hydroprocessing reactor. VGO hydroprocessing effluent includes a heavier aqueous liquid component, a lighter hydrocarbonaceous liquid component and, in addition, a hydrogen-rich gas component. Although the following description of the invention is in part directed specifically to the separation of a VGO hydroprocessing reactor effluent, it will be apparent that any mixture of a lighter liquid and a heavier liquid, and optionally a gas, can be separated in an identical manner.

In separating a lighter hydrocarbonaceous liquid component, a heavier aqueous liquid component and a gaseous component of a VGO hydrotreater effluent mixture, the mixture is passed into the vessel 1 through the inlet 15, and the liquid components flow downwardly and longitudinally through the coalescing pad 19 into the lower longitudinal space 5. Liquids are prevented from entering the upper space 3 by the vertical baffle 39. Gases which may be present in a mixture entering the vessel 1 from the inlet 15, e.g., hydrogen-rich gas, rapidly and substantially completely separate from the mixture of liquids, and flow over the top of the coalescing pad 19 and the vertical baffle 39, and through the upper space 3 to the mist remover 65. Substantially all entrained liquid mist in the gas is removed from the gas in the mist remover 65, falling downwardly into the space 3. Gases then exit the vessel through the gas outlet 61.

In the lower space 5, the lighter and heavier liquids gravity separate into a lower, heavier phase comprising a major portion of the heavier liquid and an upper, lighter phase comprising the lighter liquid with a minor portion of the heavier liquid therein. The minor portion of the heavier liquid in the upper phase is typically present therein in the form of small, entrained droplets. A stream of the heavier, aqueous liquid is removed from the vessel by passing the lower phase out of the lower space 5 through the liquid outlet 21. The lower phase is withdrawn from the lower space 5 at a controlled rate sufficient to maintain an upper surface of the lower phase, depicted at the line 67 in the attached drawings, at a level above the opening from the space 5 into the outlet 21 and below the baffle 7, and preferably at a level above the outlets 59 of the conduits 55. The level of the lower phase in vessel 1 can be controlled in any conventional manner, as by including a valve (not shown) on the conduit connected to the outlet 21, by which aqueous liquid is removed from the system. Conventional level sensing means, not shown in the drawing or described herein for the sake of simplicity, may be used for determining the level 67 of the lower phase in the vessel 1. Positioning and operation of such control valves, level sensing means and level controlling means are within the ability of those skilled in the art.

According to the invention, the upper phase is passed from the end 11 of the lower space 5 into the end 9 of the upper space 3, and is flowed through the upper space 3 toward the other end 37 thereof. During passage of the upper phase through the upper space 3, the minor portion of heavier liquid therein substantially completely gravity separates from the upper phase, passing downwardly to the sloping floor 25 of the space 3. Because the floor 25 slopes from a higher portion to a lower portion, the gravity separated minor portion of heavier liquid flows downwardly along the floor toward the lower portion, which, in the embodiment depicted, is located adjacent the lateral edges 29 and 31 of the floor 25 adjacent the lateral walls 33 and 35, respectively, of the shell 13. The gravity separated minor portion of heavier liquid is prevented from passing off the floor 25 at the end 47 of the baffle 7 by the vertical baffle 45, and is prevented from leaving the floor 25 at the other end by the vertical baffle 39.

After the minor portion of heavier liquid has been gravity separated, the upper phase is substantially heavy liquid-free. The lighter liquid is removed from the vessel 1 by passing the heavy liquid free upper phase out of the upper space 3 from a locus at least as high as the higher portion of the floor 25, and preferably from a locus at or near the highest point of the floor 25, as at the centerline 27 thereof. The upper phase is removed from the upper space through an opening into the lighter liquid outlet 51, the opening preferably being located adjacent the juncture of the vertical baffle 39 and the centerline 27 of the floor 25. The upper phase is withdrawn through the conduit 51 at a controlled rate sufficient to maintain an upper surface of the upper phase, depicted in the drawing at the line 69, at a level above the higher portion of the floor 25, preferably above the centerline 27, and at a level below the top 40 of the vertical second baffle 39. The level of the upper phase in the space 3 may be maintained within the indicated limits by the same type of means employed to regulate the level of the lower phase such as level sensing means, level controlling means, valves, etc., the use and placement of which are well known to those skilled in the art.

Further according to the invention, the minor portion of heavier liquid which is gravity separated from the upper phase in the space 3, and which collects over the lower portion of the floor 25 adjacent the edges 29 and 31 thereof, is passed into the conduits 55 through the openings 57 in the floor 25 and flows downwardly into the lower phase in the lower part 23 of the lower space 5, passing out through the openings 59 below the upper surface 67 of the lower phase. Accordingly, the minor portion of heavier liquid which is separated from the upper phase need not pass directly through the lighter phase flowing though the upper part of the space 5. Thus, reentrainment of heavier liquid in the upper phase is avoided.

Various modifications and variations of the above-described embodiment within the scope of the present invention will be apparent to those skilled in the art from the description and drawings. It is accordingly intended that the invention include such obvious alternatives, modifications and variations as are within the scope of the appended claims.

What is claimed is:

1. Apparatus for gravity separation of a lighter liquid from a heavier liquid comprising in combination:
 a vessel adapted to contain a mixture of said heavier and lighter liquids flowing longitudinally therein;
 generally horizontal baffle means extending transversely entirely across the interior of said vessel and extending longitudinally to separate an upper space above said baffle means from a lower space below said baffle means in said vessel, said upper space and said lower space being in communication through passage means located adjacent a first longitudinal end of said baffle means;

said baffle means defining a sloping floor of said upper space, said floor having a higher portion and a lower portion;

means extending upwardly from a second longitudinal end of said horizontal baffle means to a height above said higher floor portion and extending transversely entirely across said horizontal baffle means for preventing the flow of liquid between said upper space and lower space;

said vessel including inlet means for introducing a mixture of said lighter liquid and said heavier liquid into said vessel and into said lower space adjacent said second longitudinal end of said baffle means, said mixture flowing toward said first end of said baffle means whereupon said heavier liquid gravity separates from said lighter liquid and collects along the bottom of said lower space, and said lighter liquid flows along the top of said lower space and enters said upper space through said passage means;

said vessel including liquid outlet means communicating with said lower space for conducting said heavier liquid from said vessel;

first conduit means communicating with said upper space for conducting said lighter liquid from said vessel; and second conduit means communicating with said upper space at a location lower than said first conduit means and adjacent said lower portion of said upper space floor for conducting from said upper space into said lower space heavier liquid which enters said upper space and gravity separates from said lighter liquid along said sloping floor.

2. Apparatus as defined in claim 1 wherein said vessel comprises a shell completely surrounding said upper space and said lower space, forming a liquid-tight and gas-tight enclosure.

3. Apparatus as defined in claim 2 wherein said vessel further includes gas outlet means communicating with said upper space at a location above the horizontal baffle means for conducting gases from said vessel.

4. Apparatus as defined in claim 3 wherein said shell includes an end portion which is spaced from said second end of said baffle means, said upwardly extending means for preventing the flow of liquid from between said upper and lower spaces comprising a generally vertical baffle means; said inlet means being disposed above said horizontal baffle means so that gas in said liquid mixture communicates with said gas outlet over said vertical baffle means.

5. Apparatus as defined in claim 1 wherein said second conduit means comprises at least one conduit communicating at one end thereof with said upper space and communicating at an opposite end thereof with a lower part of said lower space.

6. Apparatus as defined in claim 5 wherein said generally horizontal baffle means is shaped to define a floor which slopes downwardly from a higher longitudinal centerline portion thereof toward lower lateral edge portions thereof adjacent lateral walls of said vessel, and said second conduit means communicates with said upper space adjacent each lateral edge portion of said floor.

7. Apparatus as defined in claim 6 further including a generally vertical baffle means at said first end of said generally horizontal baffle means, said vertical baffle means extending upwardly no higher than said higher floor portion and extending transversely entirely across said vessel, for retaining said heavier liquid in said upper space above said lower portion of said floor.

8. Apparatus as defined in claim 4 wherein said first and second conduit means are located adjacent said first end of said horizontal baffle means.

9. Apparatus as defined in claim 1 further including a generally vertically oriented coalescing pad disposed transversely within said vessel between said inlet means and said horizontal baffle means.

10. A method for gravity separating a lighter liquid from a heavier liquid which comprises the steps of:
  a. passing a mixture of the lighter liquid and the heavier liquid into one end of a lower space in a vessel, and flowing the mixture toward an opposite end of the lower space beneath a generally horizontally extending baffle which separates the lower space from an upper space in said vessel, said mixture thereby separating and forming a lower phase comprising a major portion of the heavier liquid and an upper phase comprising the lighter liquid and a minor portion of the heavier liquid;
  b. passing the upper phase from the opposite end of the lower space into an adjacent end of said upper space in the vessel, the horizontal baffle forming a sloping upper space floor sloping from a higher portion thereof to a lower portion thereof, and retaining said upper phase in said upper space by a generally vertical baffle extending entirely across an end of the upper space located opposite said adjacent end thereof;
  c. removing the heavier liquid from the vessel by passing the lower phase from said lower space through a first liquid outlet at a rate sufficient to maintain an upper surface of the lower phase above said first liquid outlet and below the horizontal baffle;
  d. flowing the upper phase from said adjacent end of said upper space toward said opposite end thereof, said minor portion of said heavier liquid thereby separating from said upper phase and gravitating toward the lower portion of the sloping upper space floor;
  e. removing the lighter liquid from the vessel by passing the remaining upper phase from the upper space from a locus at least as high as the higher portion of the sloping floor through a second liquid outlet at a flow rate sufficient to maintain an upper surface of the upper phase above the higher portion of the sloping floor and below the top of the vertical baffle; and
  f. flowing said separated minor portion of the heavier liquid from the upper space above the lower portion of the upper space floor into the lower phase in the lower space.

11. A method according to claim 10 wherein gas is introduced with said mixture, said vessel being formed as a gas-tight and liquid-tight shell surrounding said upper space and said lower space, and said gas is removed from said vessel through a gas outlet in the upper side of said shell.

12. A method according to claim 10 wherein said step of flowing the upper phase comprises flowing the upper phase along an upper space floor which slopes downwardly from a higher longitudinal centerline portion toward lower lateral edge portions at either side thereof adjacent lateral walls of said vessel, said separated minor portion of said heavier liquid gravitating toward said lateral edge portions.

13. A nethod according to claim 12 wherein said removing step comprises removing said lighter liquid from a location adjacent the juncture of said higher centerline portion of said sloping floor with said vertical baffle.

14. A method according to claim 10 wherein said step of flowing said separated minor portion of said heavier liquid comprises passing said separated minor portion from said upper space above said lower portion of said upper space floor into said lower phase through at least one conduit communicating at one end with said upper space and communicating at an opposite end with said lower space at a locus below said upper surface of said lower phase.

15. A method according to claim 10 wherein said mixture is passed through a coalescing pad prior to entering said one end of said lower space.

* * * * *